Sept. 9, 1930.  H. W. BUTTERWORTH, JR., ET AL  1,775,507
CLOTH CLAMP
Filed Oct. 3, 1928
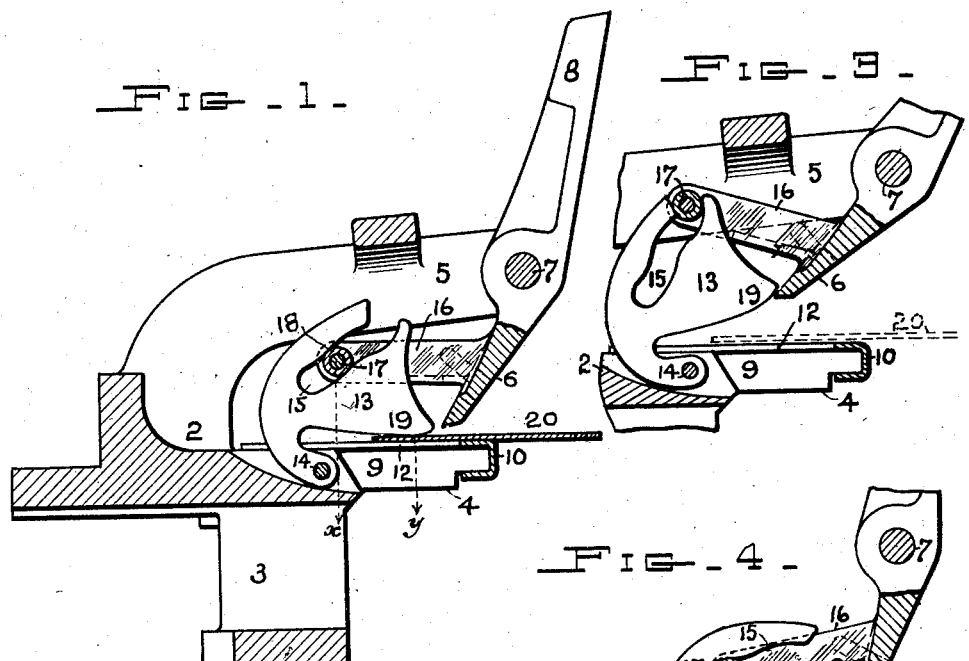
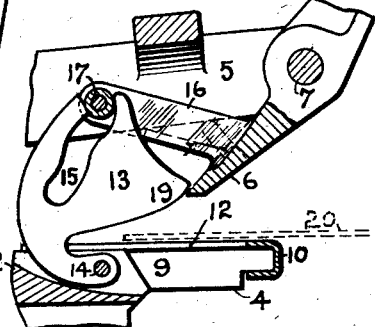
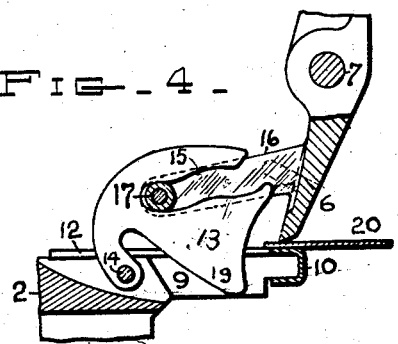
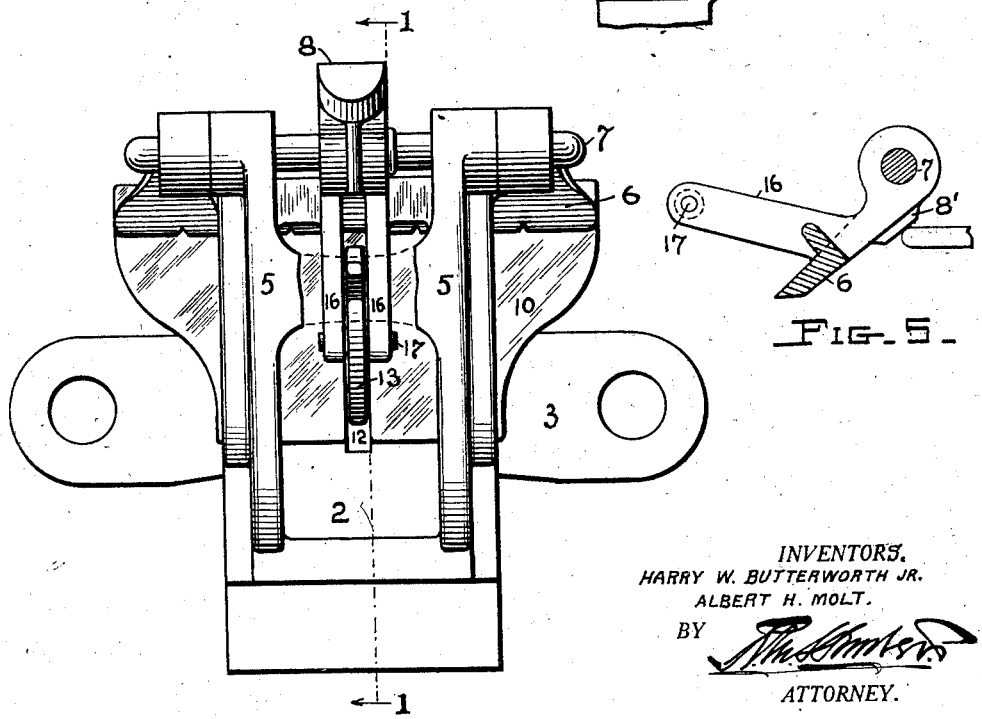
INVENTORS.
HARRY W. BUTTERWORTH JR.
ALBERT H. MOLT.
BY 
ATTORNEY.

Patented Sept. 9, 1930

1,775,507

UNITED STATES PATENT OFFICE

HARRY W. BUTTERWORTH, JR., OF PHILADELPHIA, PENNSYLVANIA, AND ALBERT H. MOLT, OF GLOUCESTER, NEW JERSEY, ASSIGNORS TO H. W. BUTTERWORTH & SONS COMPANY, A CORPORATION OF PENNSYLVANIA

CLOTH CLAMP

Application filed October 3, 1928. Serial No. 309,924.

Our invention has for its object a construction of cloth clamp especially intended for tentering machines and the like, which shall be suitable for handling the most delicate light weight fabrics with positiveness and accuracy and without danger of injuring the fabric preliminary to or during the stretching operations required to be performed by the machine.

In tentering machines of this character, two chains or clamps are caused to travel in a more or less parallel relation, said clamps holding the selvages of the fabric in web form, the said chains being given a relative reciprocating movement either through the oscillating agency of their carriers or by the driving mechanism of the chains themselves where the chain guides are normally stationary.

Considerable difficulty has been experienced in providing an automatic clamp adapted to operate in connection with very light or delicate fabrics, primarily because the gripping jaw of the clamp has been so combined with the controlling pivoted pawl that the weight of the gripping jaw, acting upon the fabric through the pawl during the act of gripping the selvage near the edge, is so great that the delicate fabric has not resistance sufficient to sustain the said jaw and pawl and consequently bends under the strain, becoming downwardly looped through the slotted portion of the clamp and permitting the clamping jaw to grip the fabric at a considerable distance from its selvage where it has less strength and, moreover, applying the grip upon the fabric too far in upon the body to insure a proper treatment. Furthermore, defects of this character in the gripping of the fabric have a tendency to cause it to be torn while the chains are being reciprocated during the stretching operations of the fabric. These defects are very serious when treating delicate high priced fabrics.

Heretofore, in an endeavor to provide a nip close to the selvage edge of the fabric, with cloth clamps in which the controlling pawl was pivoted above the fixed jaw and table surface thereof, the center portion of the nipping edge of the movable jaw was required to be notched out to permit the pawl to advance forwardly into said notch coincident with the backward movement of the jaw, which action was due to the fact that the pawl was pivoted at an elevation above the gripping surface of the fixed jaw, and in being raised above the said surface, the arc through which it moves caused it to first advance and then recede with respect to the backward or receding movement of the pivoted jaw, thereby causing the pawl and the pivoted jaw to be moving in opposite directions during the initial opening movement. The notching of the pivoted jaw was, therefore, necessary but objectionable, in that it had the tendency to cut or tear the fabric when of delicate texture, during the normal movements of the cloth clamp in tentering and other machines of that character.

Our invention provides a construction of cloth clamp of the character above referred to having the pawl structure so combined with the clamping jaw that the latter is held out of action by the least possible downward strain upon the fabric during its sustaining function for the pawl and during the release thereof at or about the time the clamping jaw is brought into gripping relation with the selvage of the fabric.

Our invention also provides a construction which enables the pivoted jaw and the pivoted pawl to be closely coupled and without necessitating any notching of the nipping edge of the jaw, this being possible by reason of the fact that the pawl is pivoted below the table level of the fixed jaw and a positive operating connection is provided between the pivoted jaw and pawl to impart an initial opening movement, where by the forward edge of the pawl in being raised by the action of the movable jaw during the initial opening movement for the reception of the cloth simultaneously recedes or moves in the same direction as the movement of the pivoted jaw and at a greater speed than said jaw, so that it overlaps the pivoted jaw while avoiding contact therewith.

Our invention further comprises certain features of construction more fully described hereinafter and pointed out in the claims.

Referring to the drawings: Fig. 1 is a vertical section of a cloth clamp embodying our invention, taken on line 1—1 of Fig. 2, and shown with the pawl and pivoted jaw sustained in unclamped position by the fabric; Fig. 2 is a plan view of our improved cloth clamp, with a portion of the framing broken away; Fig. 3 is a vertical section similar to a portion of Fig. 1, when the pivoted jaw of the cloth clamp is moved under the cam of the tentering machine to its most open position and ready to receive the cloth; Fig. 4 is a similar sectional view of the operative parts shown in Fig. 3, after the fabric has released the pawl and gripped by the jaw; and Fig. 5 is a vertical section showing the pivoted jaw in a modified form.

The body 2 of the cloth clamp is integral with the chain link 3, and is extended forward in the fixed jaw 4 and provided with the overhung arms 5, to the free ends of which the adjustable hinged jaw 6 is pivoted at 7. The fixed jaw may be provided with a brass or bronze table sheet 10 suitably secured in position and provided in its top surface in a slot 12 arranged at right angles to the length of the jaw; and moreover, the body casting has its fixed jaw 4 slotted at 9 immediately below and in alinement with the slot 12 in the table plate 10 of the lower fixed jaw. All of these parts are common to cloth clamps in commercial use and no claim is made to them for novelty, except in so far as they are combined with our special improvements to constitute a cloth clamp embodying our improvements.

The adjustable or pivoted jaw 6 is provided at the top with an arm 8 adapted to be moved by contact with cams in the path of its travel for moving the jaw 6 into open position, as shown in Fig. 3, for readily receiving the fabric to be treated; and is also provided with rearwardly extending arms 16, between which the upper part of a control pawl 13 is positioned and by which the pivoted jaw 6 is controlled. In Fig. 5, the pivoted paw is provided with a pad 8′ contacting with the cam for raising it.

The control pawl 13 is pivoted at its lower part on a pivot pin 14 arranged parallel to the clamping edges of the jaws 4 and 6, said pin extending across the slot 9 in the body 2 immediately below the slotted table plate 10. The pawl 13 extends upwardly through the slot 12 in the table plate 10 and is adjustable therein in a vertical plane and has a lateral portion 19 adapted to move downwardly through the said slot by gravity when permitted to do so by the cloth 20 and the pivoted jaw 6. The upper part of the pawl 13 is provided with slot 15 which exerts a cam action upon a transverse pin 17 and roller 18, constituting a pin structure carried in the free ends to the arms 16 and extending transversely through the slot, the alinement of the slot is such that its contacting edges are in substantially right angles relation to the direction of movement of the pin structure, whereby the initial opening movements of the pawl and jaw are coincident and overlap without interfering contact.

By reference to Fig. 1, it will be seen that when the part 19 of the pawl is resting upon the cloth 20, the cam slot 15 is supporting the transverse pin 17 and roller 18 in a position almost above the pivot 14 of the pawl and in such position that a vertical line carried downward at $x$ will pass close to the pivot 14 and between the said pivot and contact point $y$ of the cloth retaining portion 19, whereby the pivoted jaw 6 is held suspended out of gripping action upon the cloth but in readiness to automatically grip the cloth adjacent to the selvage thereof the moment the cloth slides from under the pawl.

In Fig. 3 is shown the position of the pawl 13 and pivoted jaw 6 when the latter is forcibly moved when passing the operating cam (not shown) of a tenter or other machine for which the cloth clamp is adapted. In this position, the clamp is moved over the selvage of the cloth indicated in dotted lines. When the cam is passed and the parts free to act under gravity, they assume the positions shown in Fig. 1, in which the cloth 20 supports the pawl and the latter in turn supports the jaw 6. As the cloth clamp is moved in the direction toward the selvage of the cloth, the latter is gradually withdrawn from under the pawl, releasing the same. When such release takes place, the pawl drops and releases the jaw 6, which, under gravity, moves downward and grips the selvage edge of the cloth as shown in Fig. 4.

We have before referred to the fact that the support of the cam slot 15 of the pawl upon the pin 17 and its roller 18 is in a vertical line $x$ passing relatively close to the pivot 14 of the pawl. It will now be understood that the leverage of the pawl from pivot 14 to the vertical line $y$, where it contacts with the cloth, is six times as great as the leverage from pivot 14 to the vertical line $x$, and consequently the downward thrust of the pawl upon the cloth is approximately only one-sixth of the downward pressure of the jaw 6 upon the pawl. Therefore, the lightest weight or texture of fabric is strong enough to sustain the downward thrust of the pawl.

It will also be seen that the position of the slot 15 sustains the movable jaw 6 closely above the fabric 20 when the pawl is resting upon the cloth and the action of the transverse pin and roller 18 of the jaw produces a quick action and imparts a rapid movement to the pawl the moment it is released by the cloth, so that the jaw 6 instantly clamps the cloth close to the selvage edge as indicated in Fig. 4.

From the foregoing, it will be understood that the cloth clamp is very positive in action, and yet the pressure of the pawl upon the cloth is so light that the most delicate fabric may be handled by a cloth clamp of this nature without being forced through the slot 12 by the action of the pawl and operative weight of the jaw controlled by the pawl.

Heretofore, it has been a common expedient, where the pawl is pivoted above the table, to provide a notched central nipping edge to furnish clearance space for the end of the pawl and made necessary because, during the first portion of its movement, it advances toward the jaw under the opening movement thereof. This notching of the nipper jaw has a tendency to injure delicate fabrics by providing abrupt edges which cut or tear the fabric. These defects are overcome by our present improvement by reason of the fact that the pivoting of the control pawl 13 below the level of the table of the fixed jaw causes the retaining portion 19, in being raised to position shown in Fig. 3, to be moved backward and away from the clamping jaw or nipper 6, with the result that they both move in the same direction and hence do not interfere nor require that the lower end of the jaw 6 shall be notched or cut away to permit the movement of the pawl when the parts are being moved into their receiving position (Fig. 3).

By referring to Fig. 1, it will be readily perceived that as the clamping jaw 6 is moved upward and to the left, the retaining portion 19 of the control pawl will also be moved upward and to the left with a maximum movement to the position shown in Fig. 3; and as they both move in the same general direction they will not interfere, and consequently no cutting away of the gripping jaw is necessary. By reason of this capacity of the jaw and pawl to be moved in the same direction, the retaining portion 19 of the pawl may be shaped to be controlled by the fabric very close to the nipping end of the jaw 6, as shown in Fig. 1, and consequently these parts may be proportioned to provide a very close nip to the selvage edge without interference and without objectionably notching of the nipping edge to permit passage of the retaining pawl.

It will now be apparent that we have devised a novel and useful construction which embodies the features of advantage enumerated as desirable, and while we have in the present instance shown and described the preferred embodiment thereof which has been found in practice to give satisfactory and reliable results, it is to be understood that we do not restrict ourselves to the details as the same are susceptible of modification in various particulars without departing from the spirit or scope of the invention.

Having now described our invention, what we claim and desire to secure by Letters Patent is:

A cloth clamp of the character stated, comprising a body part having a slotted fixed jaw, a pivoted jaw hinged above the fixed jaw and movable rearward out of gripping relation with the fixed jaw, a cloth controlled pawl pivoted on an axis below the plane of the gripping surface of the fixed jaw and having a forwardly extending portion movable through the slot of the fixed jaw and also having its forward end shaped and positioned with respect to its axis so that a rising movement causes the said end to recede from the pivoted jaw during its backward movement, and a close positive operative connection between the pawl and pivoted jaw comprising a slot and a pin structure the width of which slot is substantially equal to the diameter of the pin and the alignment of the slot walls are at substantially right angles to the direction of movement of the pin structure whereby the initial opening movement of the pawl and movable jaw are coincident and the forward supporting extension of the pawl moves with the pivoted jaw in the same direction but at a greater initial speed so as to pass from below to above the gripping edge of the pivoted jaw before its opening movement can cause the said edge to strike the pawl.

In testimony of which invention, we hereunto set our hands.

HARRY W. BUTTERWORTH, JR.
ALBERT H. MOLT.